(12) United States Patent
Shpilyuck et al.

(10) Patent No.: US 11,323,552 B2
(45) Date of Patent: May 3, 2022

(54) AUTOMATIC SECURITY CONFIGURATIONS IN DISASTER RECOVERY

(71) Applicant: EMC IP Holding Company LLC, Hopkinton, MA (US)

(72) Inventors: Boris Shpilyuck, Ashdod (IL); Assaf Natanzon, Tel Aviv (IL); David Zlotnick, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/389,754

(22) Filed: Apr. 19, 2019

(65) Prior Publication Data

US 2020/0336574 A1 Oct. 22, 2020

(51) Int. Cl.
| | | |
|---|---|---|
| *G06F 15/16* | (2006.01) | |
| *H04L 69/40* | (2022.01) | |
| *H04L 41/12* | (2022.01) | |
| *H04L 45/28* | (2022.01) | |
| *H04L 41/0654* | (2022.01) | |
| *H04L 45/02* | (2022.01) | |
| *H04L 41/0663* | (2022.01) | |
| *H04L 41/0806* | (2022.01) | |

(52) U.S. Cl.
CPC .......... *H04L 69/40* (2013.01); *H04L 41/0654* (2013.01); *H04L 41/12* (2013.01); *H04L 45/28* (2013.01); *H04L 41/0663* (2013.01); *H04L 41/0806* (2013.01); *H04L 45/02* (2013.01)

(58) Field of Classification Search
CPC ..... H04L 69/40; H04L 41/12; H04L 41/0654; H04L 45/28
See application file for complete search history.

(56) References Cited

U.S. PATENT DOCUMENTS

| | | | | |
|---|---|---|---|---|
| 6,445,704 B1 * | 9/2002 | Howes | ................. | H01R 31/005 370/392 |
| 7,877,490 B1 * | 1/2011 | Talagala | ................ | H04L 67/148 709/227 |
| 8,631,133 B1 * | 1/2014 | Jonnala | ............... | H04L 67/1097 709/227 |
| 9,087,001 B1 * | 7/2015 | Christensen | ........ | G06F 11/1469 |
| 9,154,529 B2 * | 10/2015 | Kolesov | ................ | H04L 65/105 |
| 9,183,097 B2 * | 11/2015 | Tarves, Jr. | .......... | G06F 11/1415 |
| 10,210,010 B1 * | 2/2019 | Ramachandran | ... | G06F 11/2038 |
| 10,326,655 B1 * | 6/2019 | Sait | ..................... | H04L 41/0846 |
| 2002/0120782 A1 * | 8/2002 | Dillon | ................. | H04L 61/6013 709/246 |
| 2008/0294784 A1 * | 11/2008 | Wang | ................... | H04L 69/163 709/228 |
| 2009/0059788 A1 * | 3/2009 | Granovsky | ............. | H04L 47/37 370/235 |

(Continued)

*Primary Examiner* — Hieu T Hoang
(74) *Attorney, Agent, or Firm* — Workman Nydegger

(57) ABSTRACT

Systems and methods for automatically configuring security groups during data protection operations including disaster recovery operations. In preparation for recovering a source site to a target site, security information at the source site is collected and classified. The classified security information is stored as a disaster recovery plan at least for security aspects of the disaster recovery process. The disaster recovery plan can be implemented at the target site such that security risks are minimized and connectivity errors are minimized during the recovery process.

14 Claims, 3 Drawing Sheets

(56) References Cited

U.S. PATENT DOCUMENTS

| | | | |
|---|---|---|---|
| 2011/0138136 A1* | 6/2011 | Shitomi | G06F 3/0644 |
| | | | 711/154 |
| 2014/0223435 A1* | 8/2014 | Chang | H04L 67/38 |
| | | | 718/1 |
| 2016/0150055 A1* | 5/2016 | Choi | H04L 69/22 |
| | | | 370/401 |
| 2016/0239392 A1* | 8/2016 | Deng | G06F 11/1448 |
| 2017/0104755 A1* | 4/2017 | Arregoces | H04L 63/102 |
| 2017/0134971 A1* | 5/2017 | Huang | H04L 41/0893 |
| 2017/0286158 A1* | 10/2017 | Dai | H04L 67/2814 |
| 2018/0027096 A1* | 1/2018 | Michael | H04N 21/6332 |
| | | | 370/474 |
| 2018/0157561 A1* | 6/2018 | Venkatesh | G06F 8/65 |
| 2018/0359145 A1* | 12/2018 | Bansal | H04L 41/28 |
| 2019/0268216 A1* | 8/2019 | Wu | G06F 11/3495 |
| 2019/0273809 A1* | 9/2019 | Boucadair | H04L 67/14 |
| 2020/0057667 A1* | 2/2020 | Ramachandran | G06F 9/45558 |
| 2020/0167248 A1* | 5/2020 | Varshney | H04L 61/2007 |

\* cited by examiner

AUTOMATIC SECURITY CONFIGURATIONS IN DISASTER RECOVERY

FIELD OF THE INVENTION

Embodiments of the invention relate to systems, methods, and apparatus for protecting data. Embodiments of the invention more specifically relate to systems and methods for automating security configurations in preparation for and/or when performing disaster recovery operations.

BACKGROUND

The computing systems in use today are complex and powerful. Many entities operate very large networks that may include hundreds of different machines (physical and virtual). The ability to access data and serve the needs of the entities themselves and their customers is significant. Consequently, most entities take data protection very seriously.

One aspect of data protection is disaster recovery. Generally, disaster recovery is the ability of an entity to recover from some event that adversely impacts the entity's computing system. A disaster recovery plan, when successful, allows an organization to recover from these types of events.

One of the most challenging and error prone steps that is performed during disaster recovery relates to security rules. There are substantial risks involved when the recovered system does not have the proper security. In addition, the recovered system may not function when the recovered system is not properly configured.

In fact, a system that is not configured properly does not always identify the error. Rather, the system simply does not operate or experiences connectivity issues. When the error is not identified (or even when the error is identified in some instances), the ability to find the misconfiguration in a system that is very large can consume substantial time and labor, both of which impact the entity negatively.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection and to systems, methods, and apparatus for performing data protection operations. Examples of data protection operations include, but are not limited to, backup operations, restore operations, replication operations, data synchronization operations, image creation operations, cloud-based image replication operations, planning operations, disaster recovery operations, or the like or combination thereof. More particularly, embodiments of the invention relate to systems, hardware, software, computer-readable media, and methods for performing data protection operations.

More specifically, embodiments of the invention relate generating a disaster recovery plan and to performing disaster recovery operations. When performing disaster recovery or when planning for disaster recovery for a large production site, there is a need to configure security rules. Security rules include including identifying ports and IP addresses. More specifically, the security rules include identifying to which ports and from which IP addresses connection are made on each virtual machine. If this information is misconfigured, the entire disaster recovery site has a security risk.

Embodiments of the invention automate the creation of security rules that allow a production site to be recovered to a target site in the event of a disaster or other negative event. Security groups and their security configuration, which may include firewall settings, are automated.

Figure 1:
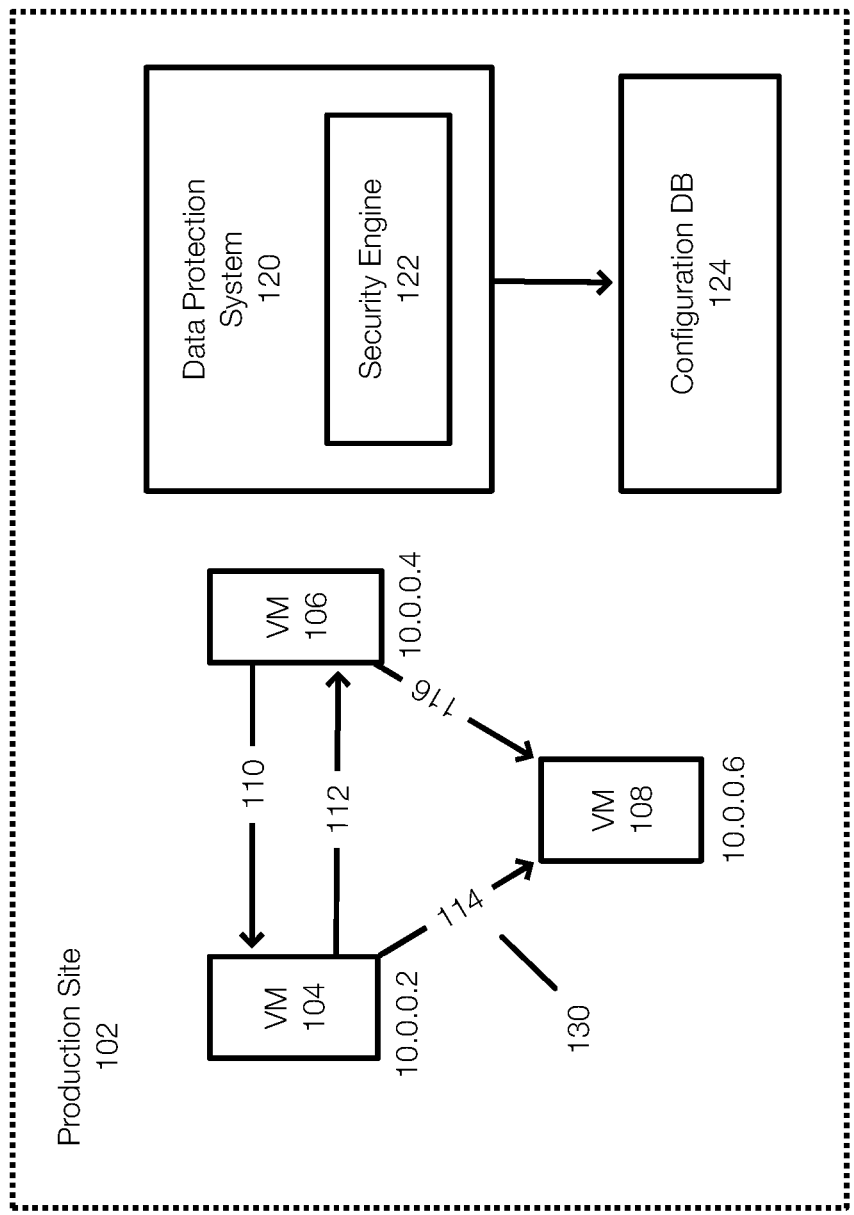
FIG. 1 illustrates an example of a computing system at a production site and illustrates an example of a data protection system configured to identify a security configuration.

The data protection system may include a security engine that is configured to generate a disaster recovery plan. FIG. 1 illustrates an example of a data protection system configured to generate a disaster recovery plan including a security plan.

FIG. 1 illustrates a production site 102. The production site 102 may an on-premise site or be located in a computing environment such as the cloud. The production site 102 may provide computing resources that allow virtual machines to be instantiated and run. The production site 102 may support a very large number of virtual machines (e.g., 100 or more or 1000 or more).

FIG. 1 also illustrates an example of a security group 130. The production site 102 may have a plurality of security groups. Alternatively, the virtual machines may all be part of the same security group. The security group 130 includes, in this example, virtual machines (VMs) 104, 106 and 108.

Connections 110, 112, 114, and 116 represent connections or communications that occur within the security group 130. In this example, each of the virtual machines 104, 106, and 108 is associated with an IP address. The virtual machines 104, 106, and 108 may have, respectively, IP addresses 10.0.0.2, 10.0.0.4, and 10.0.0.6. Each of the virtual machines 104, 106, and 108 may also have ports.

A port is a number used to uniquely identify a transaction over a network by specifying both the host, and the service. They are necessary to differentiate between many different IP services, such as web service (HTTP), mail service (SMTP), and file transfer (FTP).

A port often identifies a manner in which communication is performed or identify a service that is needed. For example, when the virtual machine 104 communicates with the virtual machine 108, the communication 114 may identify both an IP address and a port. This ensures that the data is sent to the appropriate application. Further, the port number may identify the service on the virtual machine 108. For example, the port number for SMTP may be 25, the port number for HTTP is often 80, the port number for SSH may be 22 and the port number for HTTPS may be 443.

Port numbers can enhance the security of a network such as the production site 102. Port numbers may be used in providing firewall security by stipulating the destination of information on a network. Ports can be used to prevent communications or access. For example, a firewall can be configured to prevent any packet destined to port 80 from passing through the network or through a router. This demonstrates that if the security (IP addresses and/or ports) are misconfigured, there is a security risk to the production site. More specifically, misconfigured security information may pose a security risk to the recovered network and/or prevent the recovered network from proper operation.

FIG. 1 illustrates further a data protection system 120 that includes a security engine 122. The data protection system 120 may provide different data protection services including backup services, storage services, restore services, and disaster recovery services. In this example, the data protection system 120 includes a security engine 122 that is tasked with developing a disaster recovery plan or portion thereof and/or performing at least a part of a disaster recovery operation.

In this example, the security engine 122 is configured to produce a disaster recovery plan that may be stored in a configuration database (DB) 124. In one example, the security engine 122 may analyze network traffic in the production site 102 and/or in the security group 130. This may be done by monitoring traffic at routers, or by sniffing the network traffic or the like. The network analysis performed by the security engine 122 is typically performed on all communications that are initiated within or inside the production site 102 or within each security group 130. Connections initiated from outside of the production site 102 may not be considered by the security engine 122.

In one example, the security engine 122 identifies the IP and port of the virtual machine initiating a connection and the IP and port of the virtual machine that is the target of the communication. For example, an analysis of the virtual machine 108 may result in the determination that a connection 114 from the virtual machine 102 or from IP 10.0.0.2 is allowed over port 22 and that a connection 116 from the virtual machine 106 or IP 10.0.04 is allowed over port 443.

The network analysis performed by the security engine 122 may result in the collection of the following information: originating VM IP, destination VM IP, port. A subset of this information may also be collected. This information can then be processed such that each of the virtual machines can be associated with connection vectors (e.g., [initiator IP, port]).

For example, the virtual machine 108 (and thus the target IP for purposes of this example) may be associated with the following vectors {10.0.0.2, 22}, {10.0.0.4, 443}. This indicates that SSH connections to the virtual machines 108 are allowed from the virtual machine whose IP is 10.0.0.2 (virtual machine 104) and that HTTPS connections are allowed from the virtual machine whose IP is 10.0.0.4 (virtual machine 106). In another example the security vector may have a form of [target IP, source IP, port].

This information can be presented to a customer (e.g., an administrator of the production site 102) if desired. This information constitutes at least a part of a disaster recovery plan at least as far as the security configuration is concerned. The security configuration stored in the configuration database 124 can be applied to the virtual machines at the target site during the disaster recovery process.

Figure 2:
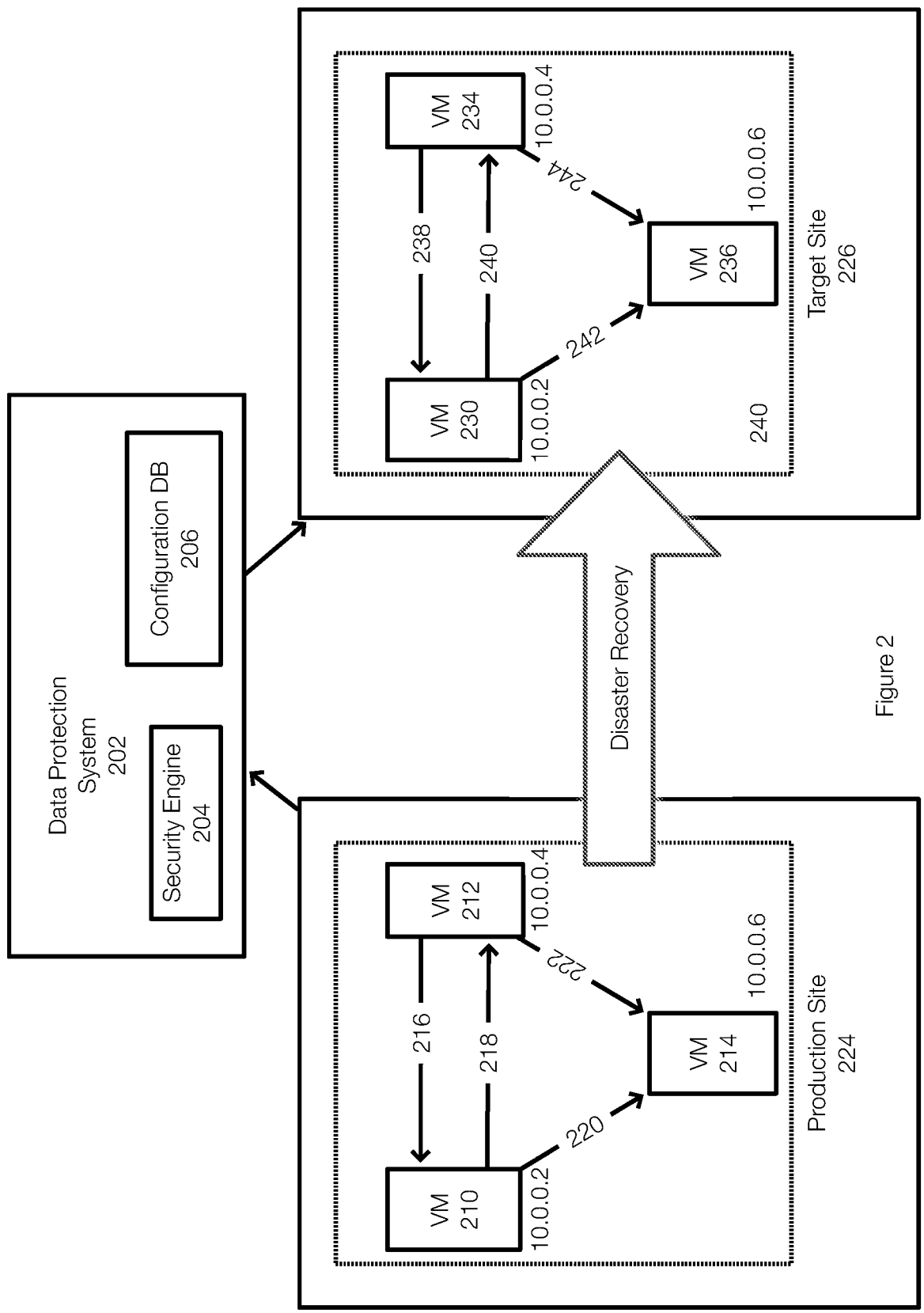
FIG. 2 illustrates an example of both a disaster recovery plan and an example of disaster recovery.

FIG. 2 illustrates an example of a disaster recovery operation based on a disaster recovery plan. FIG. 2 illustrates a disaster recovery of a production site 224 to a target site 226. The production site may be a datacenter (in the cloud or on-premise) and the target site 226 may also be a datacenter in the cloud or in another location.

In this example, the data protection system 202 or more specifically the security engine 204 may generate a disaster recovery plan for the production site 224 that is stored in the configuration database 206. This may include information about the virtual machines 210, 212 and 214 and the connections 216, 218, 220 and 222 that occur within the network of the production site 224.

During disaster recovery, the production site 224 is recovered to the target site 226. In this example, the virtual machines 210, 212, and 214 are recovered, respectfully, as virtual machines 230, 234, and 236. These virtual machines may be recovered from a backup, migrated to the target site 226, or in another manner. At an appropriate time, the security configuration stored in the configuration database 206 is applied to the virtual machines at the target site 226.

In this example, the network 240 may be a private network. During the disaster recovery operation, the virtual machines 230, 234 and 236 are given the same IP addresses that they had at the production site 224. Thus, the virtual machine 230 has the IP address 10.0.0.2—like the virtual machine 210 to which the virtual machine 230 corresponds. Further, the security configuration also specifies the appropriate ports for the communications that are initiated within the network 240. Thus, the connections 238, 240, 242 and 244 correspond to, exactly, the connections 216, 218, 220 and 222.

The execution of the disaster recovery plan generated by the security engine 204 thus results in a recovered network 240 at the target site whose security is not compromised and that does not have (or has substantially reduced) connectivity errors. The security engine 204 can produce and implement security rules for one or more security groups in an automated manner with no manual involvement. This makes configuring the disaster recovery site or the virtual machines at the target site less error-prone, mitigates security risks, and improves the customer experience when doing disaster recovery of critical sites to the cloud.

Figure 3:
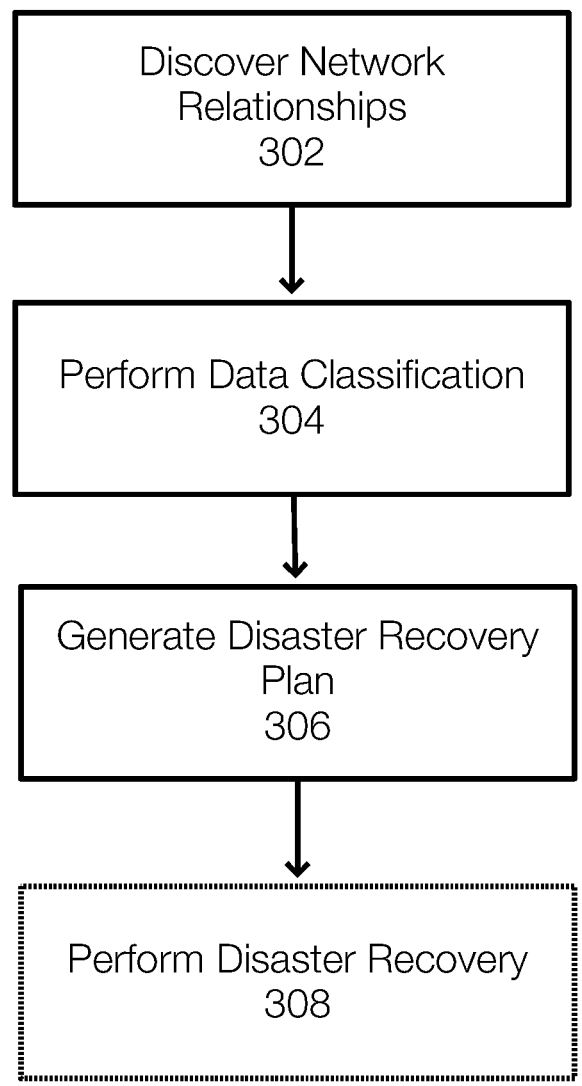
FIG. 3 illustrates an example of a method for performing disaster recovery in a computing system.

FIG. 3 illustrates an example of a method for generating a disaster recovery plan and, if necessary, for performing disaster recovery from a production or source site to a target site. The method may begin by discovering 302 network relationships. This may include analyzing network traffic to identify the relationships and connections between virtual machines in at least part of a source network. The relationships and connections include security relationships such as associations between initiating virtual machines, target virtual machines, and ports. Network relationships are discovered for all connections that are initiated within the host or source network.

Next, data classification is performed 304. The data classification is performed based on the network relationships previously discovered. In particular, the data is classified to generate, for each virtual machine, security vectors of the form [connector IP address, port]. Each security vector defines the allowed connection initiators that should be defined for the corresponding security group. As previously stated for example, a target virtual machine with an IP address of 10.0.0.6 may be associated with vectors [10.0.0.2, 22] and [10.0.0.4, 443]. These vectors define which virtual machines may initiate connections with the target virtual machine and over which ports. The other virtual machines will be associated with similar vectors.

After the network information is classified, the disaster recovery plan is generated 308. The plan may be stored in a configuration database and is configured to be read and written to the virtual machines during the recovery operation.

If necessary, disaster recovery can be performed 308 using the prepared disaster recovery plan. In one example, embodiments of the invention provide systems, method and apparatus for automatically configuring a group of virtual machines operating at a source site for recovery at a target site. Both the source site and the target site may be datacenters (on-premise or cloud) and may relate to private, public or hybrid clouds. The method may discover network relationships between virtual machines in the group of virtual machines based on communications that initiate inside the group of virtual machines at the source site. The discovered relationships are classified to form security vectors. Because of the communications between the virtual machines, each virtual machine in the group of virtual machines is associated with one or more security vectors. Each security vector may identify an initiating virtual machine and a port over which the initiating virtual machine communicates with the target virtual machine. The security vectors, once classified or determined, can be stored as a disaster recovery plan in a configuration database. The security vectors are configured for configuring a security configuration for the group of virtual machines when the group of virtual machines are recovered to the target site.

Classifying the discovered relationships may include organizing the collected information in order to identify which virtual machines communicate with which virtual machines. In this scenario, the security vectors for each target virtual machine can be identified and stored in the disaster recovery plan. If desired, the disaster recovery plan can be confirmed or adjusted by a user.

In one example, the security engine of the data protection plan may monitor the source network. When changes in the source network are detected, the disaster recovery plan may be updated to account for these changes.

In another example, each security group may include a set of virtual machines. These groups may be arranged by application or in another manner. Thus, the disaster recovery plan may not be applied to the entire source set. For example, it may only be necessary to recovery a specific application and corresponding virtual machines.

When recovering to the target site, a private network is often generated such that the virtual machines recovered to the private network can have the same IP addresses they had at the source site. Thus, the virtual machines may be assigned IP addresses that were held at the source site. In fact, the security information may also associate the target IP address with the relevant security vectors.

The disaster recovery plan, when implemented, may also include recovering the virtual machines to the target site. This may be achieved using a recovery operation to restore the virtual machines from images or other stored backups or by migrating the virtual machines, or in another manner.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, replication operations, image replication operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms. Further, embodiments of the invention may be implemented with local storage such as Dell EMC ECS or the like.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, the method comprising:
in a system that includes a target site and a production site, the production site including a source site that includes groups of virtual machines:
for each group of virtual machines, discovering network relationships between virtual machines in the group based on communications that initiate inside the group, wherein discovering network relationships includes monitoring the communications at routers and/or sniffing the communications in network traffic at the source site;
classifying the discovered network relationships to form security vectors, wherein each virtual machine in each group of virtual machines is associated with one or more security vectors, wherein communications initiated outside of the groups are not considered when classifying the discovered network relationships;
storing the security vectors as a disaster recovery plan in a configuration database, wherein the security vectors are configured for configuring a security configuration for the groups of virtual machines when the groups of virtual machines are recovered to the target site, wherein each security vector is specific to a virtual machine and each security vector includes only an IP address of an initiating virtual machine that initiates a communication to the virtual machine and a port; and
recovering a selected group from the groups of virtual machines to the target site, wherein a selected application corresponding to the selected group of virtual machines is recovered at the target site; and
recovering the selected group in a private network and assigning IP addresses to the virtual machines being recovered that are the same as the corresponding virtual machines at the production site;
applying the security vectors from the virtual machines in the selected group to a group of virtual machines that is being recovered at the target site, wherein the security vectors for each virtual machine in the selected group identify network relationships for the corresponding virtual machine at the target site, wherein the virtual machines at the target site are recovered in a private network and are configured to have the same IP addresses as the selected group.

2. The method of claim 1, further comprising presenting the disaster recovery plan in a user interface for confirmation or adjustment by a user.

3. The method of claim 1, further comprising updating the disaster recovery plan when changes in the virtual machines operating at the source site are detected.

4. The method of claim 1, further comprising generating a disaster recovery plan for the groups of virtual machines, wherein the virtual machines in the groups are related.

5. The method of claim 1, further comprising generating the private network at the target site.

6. The method of claim 1, further comprising performing a disaster recovery by implementing the disaster recovery plan.

7. The method of claim 6, wherein the disaster recovery plan includes recovering the virtual machines to the target site.

8. A non-transitory computer readable medium comprising computer executable instructions that, when executed, perform a method for automatically recovering a group of virtual machines at a target site, the method comprising:

in a system that includes a target site and a production site, the production site including a source site that includes groups of virtual machines:

for each group of virtual machines, discovering network relationships between virtual machines in the group based on communications that initiate inside the group, wherein discovering network relationships includes monitoring the communications at routers and/or sniffing the communications in network traffic at the source site;

classifying the discovered network relationships to form security vectors, wherein each virtual machine in each group of virtual machines is associated with one or more security vectors, wherein communications initiated outside of the groups are not considered when classifying the discovered network relationships;

storing the security vectors as a disaster recovery plan in a configuration database, wherein the security vectors are configured for configuring a security configuration for the groups of virtual machines when the groups of virtual machines are recovered to the target site, wherein each security vector is specific to a virtual machine and each security vector includes only an IP address of an initiating virtual machine that initiates a communication to the virtual machine and a port; and recovering a selected group from the groups of virtual machines to the target site, wherein a selected application corresponding to the selected group of virtual machines is recovered at the target site; and recovering the selected group in a private network and assigning IP addresses to the virtual machines being recovered that are the same as the corresponding virtual machines at the production site;

applying the security vectors from the virtual machines in the selected group to a group of virtual machines that is being recovered at the target site, wherein the security vectors for each virtual machine in the selected group identify network relationships for the corresponding virtual machine at the target site, wherein the virtual machines at the target site are recovered in a private network and are configured to have the same IP addresses as the selected group.

9. The non-transitory computer readable medium of claim 8, further comprising presenting the disaster recovery plan in a user interface for confirmation or adjustment by a user.

10. The non-transitory computer readable medium of claim 8, further comprising updating the disaster recovery plan when changes in the virtual machines operating at the source site are detected.

11. The non-transitory computer readable medium of claim 8, further comprising generating a disaster recovery plan for the groups of virtual machines, wherein the virtual machines in the groups are related.

12. The non-transitory computer readable medium of claim 8, further comprising generating the private network at the target site.

13. The non-transitory computer readable medium of claim 8, further comprising performing a disaster recovery by implementing the disaster recovery plan.

14. The non-transitory computer readable medium of claim 13, wherein the disaster recovery plan includes recovering the virtual machines to the target site.

* * * * *